(12) United States Patent
Seo et al.

(10) Patent No.: US 12,500,801 B2
(45) Date of Patent: Dec. 16, 2025

(54) COMMUNICATION NODE, COMMUNICATION SYSTEM AND OPERATING METHOD THEREOF

(71) Applicant: SOLiD, INC., Seongnam-si (KR)

(72) Inventors: Kwangnam Seo, Gyeonggi-do (KR); Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 33 days.

(21) Appl. No.: 18/692,434

(22) PCT Filed: Aug. 24, 2022

(86) PCT No.: PCT/KR2022/012653
§ 371 (c)(1),
(2) Date: Apr. 16, 2024

(87) PCT Pub. No.: WO2023/043077
PCT Pub. Date: Mar. 23, 2023

(65) Prior Publication Data
US 2025/0141724 A1    May 1, 2025

(30) Foreign Application Priority Data

Sep. 15, 2021  (KR) .................. 10-2021-0122932

(51) Int. Cl.
*H04L 27/26* (2006.01)
*H04L 5/00* (2006.01)
(52) U.S. Cl.
CPC .......... *H04L 27/2602* (2013.01); *H04L 5/001* (2013.01); *H04L 27/2628* (2013.01)

(58) Field of Classification Search
CPC . H04L 27/2602; H04L 5/001; H04L 27/2628; H04W 88/085; H04W 72/04
See application file for complete search history.

(56) References Cited

U.S. PATENT DOCUMENTS

2011/0085514 A1   4/2011   Higuchi et al.
2014/0328431 A1   11/2014  Haddad et al.
(Continued)

FOREIGN PATENT DOCUMENTS

EP        2 835 910 A1       2/2015
KR     10-2012-0130209 A    11/2012
(Continued)

OTHER PUBLICATIONS

International Search Report for PCT/KR2022/012653 dated Nov. 24, 2022.
(Continued)

*Primary Examiner* — David S Huang
(74) *Attorney, Agent, or Firm* — Sughrue Mion, PLLC (57) ABSTRACT

Provided are a method of operating a communication node that includes a memory and a processor and receives and processes a communication signal with a variable number of component carriers comprising dividing the communication signal into a plurality of divided signals based on the number of component carriers included in the received communication signal and the number of signal processing paths provided in the communication node and distributing the plurality of divided signals to the signal processing paths provided in the communication node, respectively, and processing the divided signals.

15 Claims, 5 Drawing Sheets

(56) References Cited

U.S. PATENT DOCUMENTS

| | | | |
|---|---|---|---|
| 2015/0087245 A1 | 3/2015 | Hadji-Abdolhamid et al. | |
| 2018/0331871 A1 | 11/2018 | Martinez | |
| 2020/0119867 A1 | 4/2020 | Li et al. | |
| 2021/0100014 A1* | 4/2021 | Kong | H04W 72/0453 |

FOREIGN PATENT DOCUMENTS

| | | |
|---|---|---|
| KR | 10-2015-0140378 A | 12/2015 |
| KR | 10-2017-0130551 A | 11/2017 |
| KR | 10-2019-0117693 A | 10/2019 |
| KR | 10-2020-0118433 A | 10/2020 |

OTHER PUBLICATIONS

Written Opinion for PCT/KR2022/012653 dated Nov. 24, 2022.
Communication dated Jun. 25, 2024, issued is Korean Application No. 10-2021-0122932.
Extended European Search Report dated Aug. 22, 2025, issued in European Application No. 22870163.7.

* cited by examiner

COMMUNICATION NODE, COMMUNICATION SYSTEM AND OPERATING METHOD THEREOF

CROSS-REFERENCE TO RELATED APPLICATIONS

This is a National Stage of International Application No. PCT/KR2022/012653 filed Aug. 24, 2022, claiming priority based on Korean Patent Application No. 10-2021-0122932 filed Sep. 15, 2021.

TECHNICAL FIELD

The present invention relates to a communication node, a communication system, and a method of operating the same, and more particularly, to a communication node capable of dividing and processing a communication signal into a plurality of divided signals based on the number of component carriers included in a received communication signal and the number of signal processing paths provided in the communication node, a communication system, and a method of operating the same.

BACKGROUND ART

In an environment where the number of component carriers and a channel bandwidth included in a communication signal are variable, the configuration of signal processing paths becomes complicated because all cases need to be considered for changes in the number of component carriers and changes in the channel bandwidth, and computational complexity also greatly increases.

DESCRIPTION OF EMBODIMENTS

Technical Problem

The technical problem to be achieved by the present invention is to provide a communication node capable of dividing and processing a communication signal into a plurality of divided signals based on the number of component carriers included in a received communication signal and the number of signal processing paths provided in the communication node, a communication system, and a method of operating the same.

Solution to Problem

According to an aspect of an embodiment, a method of operating a communication node that includes a memory and a processor and receives and processes a communication signal with a variable number of component carriers, may comprise dividing the communication signal into a plurality of divided signals based on the number of component carriers included in the received communication signal and the number of signal processing paths provided in the communication node and distributing the plurality of divided signals to the signal processing paths provided in the communication node, respectively, and processing the divided signals.

According to an aspect of an embodiment, the dividing of the communication signal into a plurality of divided signals may comprise when the number of signal processing paths provided in the communication node is greater than the number of component carriers, dividing at least one component carrier into a plurality of subcarriers to form the plurality of divided signals.

According to an aspect of an embodiment, the dividing of the communication signal into a plurality of divided signals may comprise when the number of signal processing paths provided in the communication node is greater than the number of component carriers, dividing one component carrier into a plurality of subcarriers for only some component carriers to form the plurality of divided signals.

According to an aspect of an embodiment, the dividing of the communication signal into a plurality of divided signals may comprise when the number of signal processing paths provided in the communication node is equal to the number of component carriers, dividing the communication signal for each component carrier to form the plurality of divided signals.

According to an aspect of an embodiment, the number of signal processing paths provided in the communication node may be equal to the maximum number of variable component carriers.

According to an aspect of an embodiment, in the communication signal, the number of component carriers and a channel bandwidth may be varied together.

According to an aspect of an embodiment, computational complexity that can be processed in each of the signal processing paths may be determined based on the maximum number of variable component carriers and the maximum value of the channel bandwidth.

According to an aspect of an embodiment, the computational complexity that can be processed in each of the signal processing paths may comprise an FFT size of an inverse fast fourier transform (IFFT) processor or a fast fourier transform (FFT) processor included in each of the signal processing paths.

According to an aspect of an embodiment, the FFT size may correspond to a value obtained by dividing an FFT size for processing the maximum value of the channel bandwidth in a single FFT processor or IFFT processor by the maximum number of the variable component carriers.

According to an aspect of an embodiment, the computational complexity that can be processed in each of the signal processing paths may comprise computational complexity of a shaping filter included in each of the signal processing path.

According to an aspect of an embodiment, the method may further comprise receiving the communication signal through Common Public Radio Interface (CPRI), Open Radio Interface (ORI), Open Base Station Architecture Initiative (OBSAI), or e-CPRI standards.

According to an aspect of an embodiment, the communication node may be a headend device, extension device, or remote device.

According to an aspect of an embodiment, the method may further comprise combining the plurality of processed divided signals.

According to an aspect of an embodiment, a communication node that includes a memory and a processor and receives and processes a communication signal with a variable number of component carriers may comprise divide the communication signal into a plurality of divided signals based on the number of component carriers included in the received communication signal and the number of signal processing paths provided in the communication node and distribute the plurality of divided signals to the signal processing paths provided in the communication node, respectively, and process the divided signals.

According to an aspect of an embodiment, a communication system that includes a plurality of communication nodes and receives and processes a communication signal with a variable number of component carriers may comprise divide the communication signal into a plurality of divided signals based on the number of component carriers included in the received communication signal and the number of signal processing paths provided in the communication system and distribute the plurality of divided signals to the signal processing paths provided in the communication system, respectively, and process the divided signals.

Advantageous Effects of Disclosure

A method and device according to an embodiment of the present invention may adaptively respond to a variable number of component carriers and a variable channel bandwidth by dividing and processing a communication signal into a plurality of divided signals based on the number of component carriers included in a received communication signal and the number of signal processing paths provided in a communication node.

The method and device according to an embodiment of the present invention may prepare for an increase in the number of component carriers while minimizing computational complexity of each signal processing path by determining the computational complexity that can be processed in each signal processing path based on the maximum number of a variable number of component carriers and the maximum value of a channel bandwidth.

BRIEF DESCRIPTION OF DRAWINGS

A brief description of each drawing is provided to more fully understand drawings recited in the detailed description of the present invention.

MODE OF DISCLOSURE

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

Figure 1:
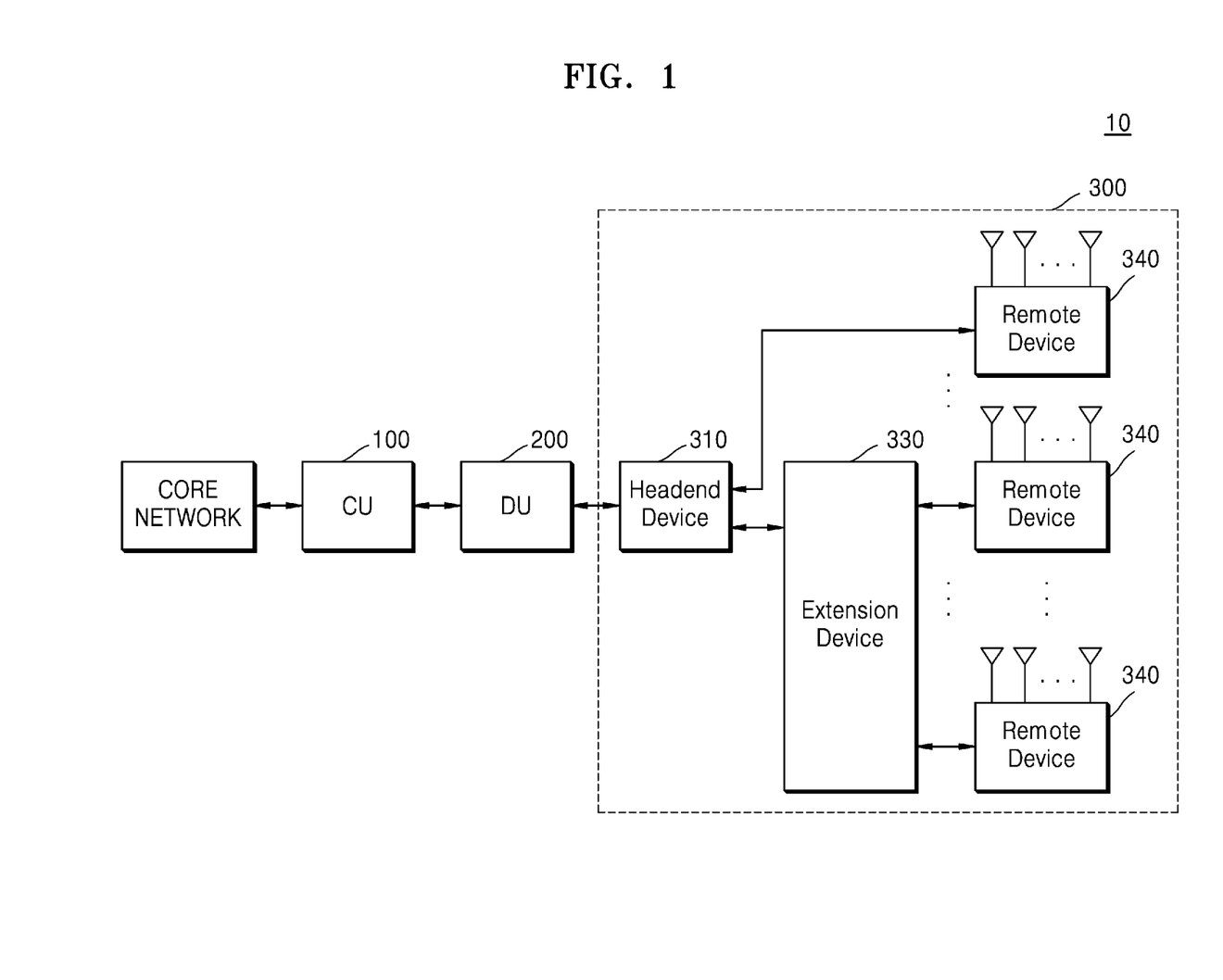
FIG. 1 is a conceptual diagram of a communication system according to an embodiment of the present invention.

FIG. 1 is a conceptual diagram of a communication system according to an embodiment of the present invention.

A communication system 10 according to an embodiment of the present invention may include a core network, a centralized unit (CU) 100, a distributed unit (DU) 200, a headend device 310, a extension device 330, and a plurality of remote devices 340.

According to an embodiment, the communication system 10 may be divided into a core network, a base station (100 and 200) constituting an access network connecting a user terminal to the core network, and a distributed antenna system (DAS) 300. At this time, the headend device 310, the extension device 330, and the plurality of remote devices 340 may form the DAS 300 that is separate from the base station, but the present invention is not limited thereto, and some components of the distributed antenna system 300 may be included in a base station network.

The base station may be divided into the centralized unit 100 and the distributed unit 200, and may be implemented as a single device according to an embodiment.

The centralized unit 100 may directly work with a core network, and may interface between the core network and the base station.

The centralized unit 100 and the distributed unit 200 may split functions in various forms according to various function split options (e.g., 3GPP TR38.801 standard, etc.).

According to an embodiment, the centralized unit 100 and the distributed unit 200 may divide and process at least a portion of RRC, PDCP, High-RLC, Low-RLC, High-MAC, Low-MAC, and High-PHY layers.

FIG. 1 illustrates a structure in which the base station is divided into the centralized unit 100 and the distributed unit 200, but the present invention is not limited thereto, and various modifications are possible.

The distributed unit 200 may process a portion of RRC, PDCP, High-RLC, Low-RLC, High-MAC, Low-MAC, and High-PHY layers according to function split, and then transmit a processed communication signal to the headend device 310 of the DAS 300.

The DAS 300 may include a headend device 310 that is communicatively connected to the distributed unit 200 and constitutes a headend node, the extension device 330 constituting an extension node, and the plurality of remote devices 340 that constitute a remote node and are connected to other remote nodes or placed at a remote service location and communicatively connected to a user terminal.

According to an embodiment, the DAS 300 may be implemented as a digital DAS, and in some cases may be implemented in a hybrid type, for example, in the form of analog processing for some nodes and digital processing for other nodes.

Meanwhile, FIG. 1 shows an example of a topology of the DAS 300 and various variations are possible in the DAS 300 considering specificity of installation areas and application fields (e.g., in-building, a subway, a hospital, a stadium, etc.).

Each node in the DAS 300 and its function will be described in more detail. First, the headend device 310 may serve as an interface with a base station.

According to an embodiment, the headend device 310 may be connected to a plurality of base stations.

According to an embodiment, the headend device 310 may be implemented with a main headend device and a sub headend device, and may be connected to a base station for each service frequency band of a specific service provider or a base station for each sector. In some cases, the main headend device may compensate for coverage by the sub headend device.

In general, the headend device 310 may process communication signals transmitted from a base station (e.g., the distributed unit 200) into a manageable form within the DAS 300 and distribute the processed signals to the extension device 330 or the remote devices 340.

According to an embodiment, the headend device 310 and the distributed unit 200 may follow various fronthaul communication standards. For example, standards such as Common Public Radio Interface (CPRI); Open Radio Interface (ORI), Open Base Station Architecture Initiative (OBSAI), or e-CPRI may be used between the headend device 310 and the distributed unit 200.

According to an embodiment, the headend device 310 may directly receive a communication signal (e.g., digital communication signals according to standards such as CPRI, ORI, OBSAI, or e-CPRI) in digital format from the base station 100.

According to another embodiment, the headend device 310 may receive an analog RF signal from a base station.

The extension device 330 in the DAS 300 may be utilized when the number of branches of the headend device 310 is limited compared to the number of remote devices to be installed.

The extension device 330 may transmit communication signals between the headend device 310 and the remote devices 340 connected to the extension device 330.

The plurality of remote devices 340 may be connected to the headend device 310 or the extension device 330 and distributed to transmit and receive signals transmitted/received to/from a base station at locations distributed in various shaded areas or dense areas.

The communication system 10 according to an embodiment of the present invention may use physical layer division between the distributed unit 200 and the headend device 310, or between the headend device 310 and the extension device 330, or between the headend device 310 and a remote device 340, or between the headend device 310 and the remote device 340.

According to an embodiment, the distributed unit 200 may process an upper physical layer High-PHY and the headend device 310 may process a lower physical layer Low-PHY.

According to another embodiment, the headend device 310 may process the upper physical layer High-PHY and the remote device 340 may process the lower physical layer Low-PHY.

According to another embodiment, the extension device 330 may process the upper physical layer High-PHY and the remote device 340 may process the lower physical layer Low-PHY.

Each of the remote devices 340 may divide received communication signals by frequency band and perform various signal processing, such as conversion and amplification between RF signals and digital signals. Each of the remote devices 340 may transmit a base station signal to a user terminal within its service coverage through a service antenna.

An antenna of the remote devices 340 may be implemented as a multiple input multiple output (MIMO) antenna, and according to an embodiment, may be implemented as a single antenna.

The remote devices 340 may be connected to each other in a cascade structure.

A base station (e.g., the distributed unit 200) and the headend device 310 may be connected to each other through an RF cable, an optical cable, or an Ethernet cable (e.g., a twisted cable or UTP cable), and at a lower end of the headend device 310, may be connected to each other through an optical cable or an Ethernet cable (e.g., a twisted cable or UTP cable). Various other variations may be possible in a signal transport medium or communication method between communication nodes.

According to an embodiment, when internal components of the DAS 300 are connected to each other by an optical cable, the headend device 310, the extension device 330, and the remote devices 340 may include an optical transceiver module for transmitting and receiving optical signals through electro-optical conversion/photoelectric conversion, and may further include a wavelength division multiplexing (WDM) device when nodes are connected to each other by a single optical cable.

The DAS 300 may be connected to an external management device (not shown) such as a network management server or a network management system (NMS) 300 or a network operation center (NOC) (not shown) via a network. Accordingly, an administrator may remotely monitor the status and problem of each node of the DAS 200, and may remotely control the operation of each node.

Detailed structures and operations of the distributed unit 200 and the headend device 310 will be described later with reference to FIGS. 2 to 4.

Figure 2:
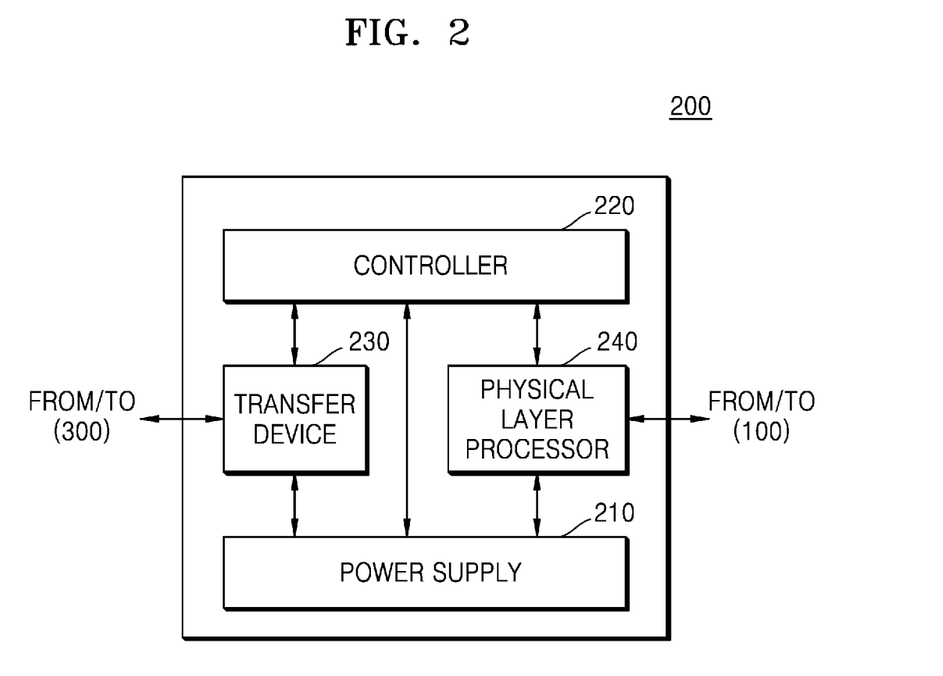
FIG. 2 is a block diagram according to an embodiment of a distributed unit shown in FIG. 1.

FIG. 2 is a block diagram according to an embodiment of the distributed unit shown in FIG. 1.

Referring to FIGS. 1 and 2, the distributed unit 200 may include a power supply 210, a controller 220, a transfer device 230, and a physical layer processor 240.

The power supply 210 may supply power to components (e.g., 220 to 240) in the distributed unit 200.

The controller 220 may control all operations of the components (e.g., 210, 230, and 240) in the distributed unit 200.

The transfer device 230 may interface communication between the distributed unit 200 and the centralized unit 300, and may perform signal processing necessary for signal transmission/reception with the centralized unit 300.

The physical layer processor 240 may process functions supported by some physical layers (e.g., the upper physical layer High-PHY).

FIG. 2 illustrates a case where physical layer division is performed between the distributed unit 200 and the headend device 310, but if the location of the physical layer division changes, the configuration of the distributed unit 200 may also change.

Figure 3:
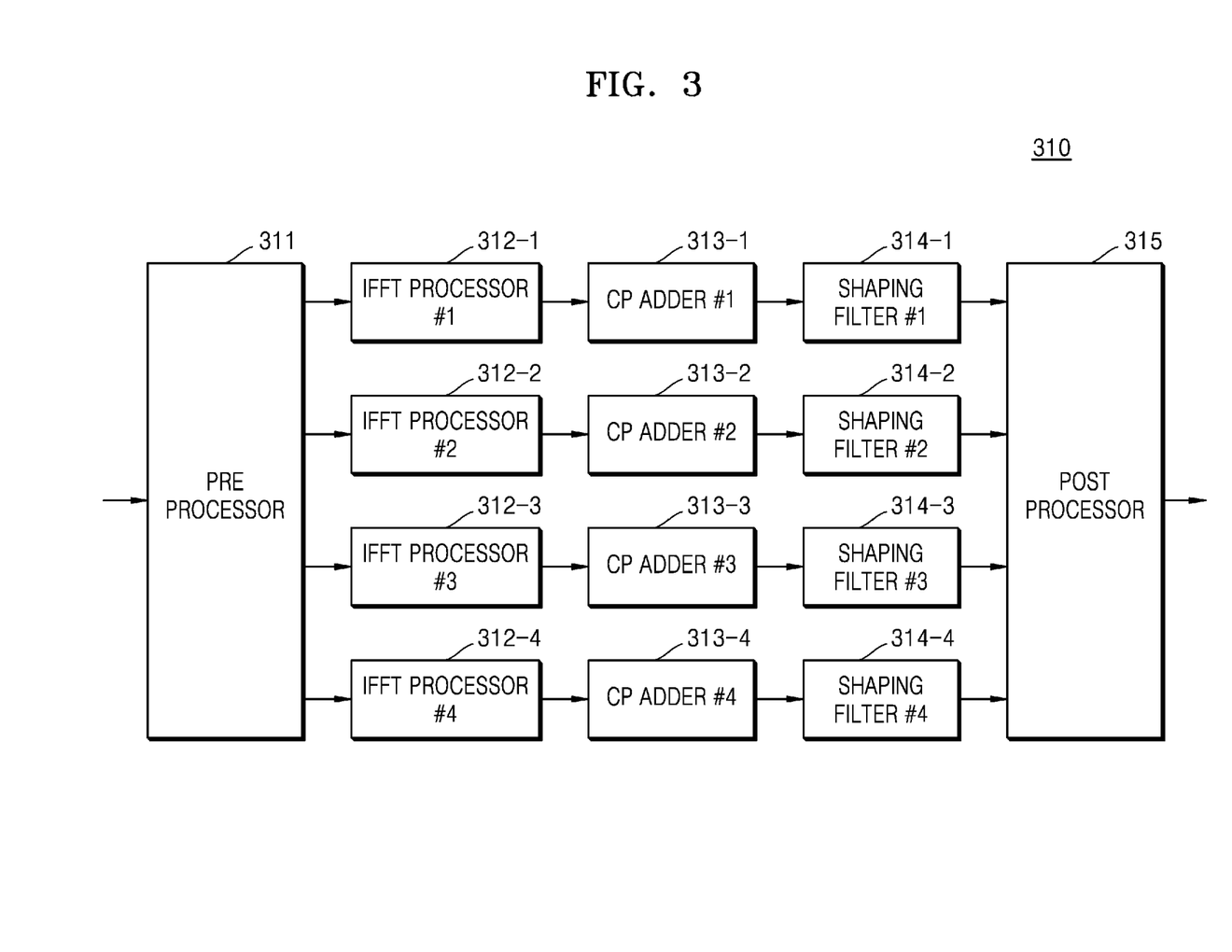
FIG. 3 is a block diagram of some components according to an embodiment of a headend device shown in FIG. 1.

FIG. 3 is a block diagram of some components according to an embodiment of the headend device shown in FIG. 1.

Referring to FIGS. 1 to 3, the headend device 310 may include a pre-processor 311, a plurality of inverse fast fourier transform (IFFT) processors 312-1 to 312-4, a plurality of cyclic prefix (CP) adders 313-1 to 313-4, a plurality of shaping filters 314-1 to 314-4, and a post-processor 315.

According to an embodiment, the headend device 310 may be implemented including a memory (not shown) and a processor, and each of the components 311, 312-1 to 312-4, 313-1 to 313-4, 314-1 to 314-4, and 315 within the headend device 310 may be composed of some functions or modules of at least one processor.

FIG. 3 only illustrates functions that can be supported and processed by the lower physical layer Low-PHY as an example, and some of the functions that can be processed may be excluded, changed, or added.

A signal processing path of a downlink communication signal in the headend device 310 may include a first signal processing path passing through the first IFFT processor 312-1, the first CP adder 313-1, and the first shaping filter 314-1, a second signal processing path passing through the second IFFT processor 312-2, the second CP adder 313-2, and the second shaping filter 314-2, a third signal processing path passing through the third IFFT processor 312-3, the third CP adder 313-3, and the third shaping filter 314-3, and a fourth signal processing path passing through the fourth IFFT processor 312-4, the fourth CP adder 313-4, and the fourth shaping filter 314-4.

The number of signal processing paths provided in a communication node (e.g., the headend device 310) may be equal to the maximum number of variable component carriers.

For example, when the number of component carriers included in a communication signal varies from 1 to 4, the number of signal processing paths provided in a communication node (e.g., the headend device 310) may be equal to the maximum number of 4.

The pre-processor 311 may receive a communication signal with a variable number of component carriers and perform a pre-processing operation on the received communication signal.

The pre-processor 311 may divide the communication signal into a plurality of divided signals based on the number of component carriers included in the communication signal and the number of signal processing paths provided in a communication node (e.g., the headend device 310) including the pre-processor 311.

According to an embodiment, when the number of signal processing paths provided in a communication node (e.g., the headend device 310) is greater than the number of component carriers, the pre-processor 311 may divide at least one component carrier into a plurality of subcarriers to form a plurality of divided signals.

For example, when the number of signal processing paths provided in a communication node (e.g., the headend device 310) is 4 and the number of component carriers included in a communication signal is 1, the pre-processor 311 may divide one component carrier into four subcarriers to form a plurality of divided signals.

For example, when the number of signal processing paths provided in a communication node (e.g., the headend device 310) is 4 and the number of component carriers included in a communication signal is 2, the pre-processor 311 may divide each of two component carriers into two subcarriers to form a plurality of divided signals.

For example, when the number of signal processing paths provided in a communication node (e.g., the headend device 310) is 4 and the number of component carriers included in a communication signal is 3, the pre-processor 311 may divide only one component carrier from among the three component carriers into two subcarriers and configure divided signals on a divided subcarrier basis, and may configure divided signals on a component carrier basis for the remaining two component carriers. That is, the pre-processor 311 may divide one component carrier into a plurality of subcarriers for only some component carriers from among a plurality of component carriers included in a communication signal to form divided signals.

According to another embodiment, when the number of signal processing paths provided in a communication node (e.g., the headend device 310) is equal to the number of component carriers, the pre-processor 311 may divide a communication signal for each component carrier to form divided signals on a component carrier basis.

For example, when the number of signal processing paths provided in a communication node (e.g., the headend device 310) is 4 and the number of component carriers included in a communication signal is 4, the pre-processor 311 may divide the communication signal for each component carrier to form a plurality of divided signals for each of the four component carriers.

A plurality of divided signals generated by being divided by the pre-processor 311 may be distributed and processed through signal processing paths provided in a communication node (e.g., the headend device 310).

Each of the plurality of IFFT processors 312-1 to 312-4 may perform IFFT processing on each of divided signals divided and distributed by the pre-processor 311.

According to an embodiment, in a communication signal, the number of component carriers and a channel bandwidth may be varied together.

Computational complexity that can be processed in each of signal processing paths may be determined based on the maximum number of variable component carriers and the maximum value of a channel bandwidth.

According to an embodiment, the computational complexity that can be processed in each of signal processing paths may include an FFT size of IFFT processors (e.g., 312-1 to 312-4) included in each of the signal processing paths.

In FIG. 3, only signal processing paths of a communication signal in downlink communication are shown, but a communication node (e.g., the headend device 310) may separately include signal processing paths of a communication signal in uplink communication. In this case, each of the signal processing paths of the communication signal may include FFT processors 319-1 to 319-4 (in FIG. 4) instead of IFFT processors (e.g., 312-1 to 312-4). The computational complexity that can be processed in each of signal processing paths may include an FFT size of the FFT processors 319-1 to 319-4 (in FIG. 4) included in each of the signal processing paths.

According to an embodiment, an FFT size of each of IFFT processors (e.g., 312-1 to 312-4) or FFT processors (not shown) may be configured to correspond to a value obtained by dividing an FFT size for processing the maximum value of a variable channel bandwidth in a single FFT processor or IFFT processor by the maximum number of variable component carriers.

For example, when an FFT size for processing the maximum value of a variable channel bandwidth in a single FFT processor or IFFT processor is 4096 points, and the number of component carriers varies from 1 to 4, an FFT size of each of IFFT processors (e.g., 312-1 to 312-4) or FFT processors (not shown) may be set to 1024 points, which is a value obtained by dividing 4096 points by 4.

Each of the plurality of the CP adders may add a CP to each of divided signals transmitted through each signal processing path.

Each of the plurality of shaping filters 314-1 to 314-4 may perform filtering to shape communication signals transmitted through each signal processing path.

According to an embodiment, the computational complexity that can be processed in each of signal processing paths may include the computational complexity of each of the plurality of shaping filters 314-1 to 314-4. For example, the computational complexity of each of the plurality of shaping filters 314-1 to 314-4 may include a filter coefficient constituting each of the plurality of shaping filters 314-1 to 314-4.

According to an embodiment, the computational complexity of each of the plurality of shaping filters 314-1 to 314-4 may be determined according to the maximum value of a variable channel bandwidth and the number of signal processing paths.

For example, the computational complexity of each of the plurality of shaping filters 314-1 to 314-4 may be configured to correspond to a value obtained by dividing the computational complexity for processing the maximum value of a variable channel bandwidth in a single shaping filter by the maximum number of variable component carriers (i.e., the number of signal processing paths).

The post-processor 315 may combine divided signals that have been subjected to shaping filtering by the plurality of shaping filters 314-1 to 314-4, respectively, and perform post-processing on the combined signals into a form that can be processed by lower nodes (e.g., 330 or 340).

In FIG. 3, for convenience of explanation, a case in which processing of the lower physical layer Low-PHY is performed in the headend device 310 is illustrated. However, according to an embodiment, the extension device 330 or the remote devices 340 may have the same configuration as the headend device 310 of FIG. 3 and perform the same signal processing as in the headend device 310 of FIG. 3.

FIG. 3 illustrates a case where the number of signal processing paths is four, but the present invention is not limited thereto and the number of signal processing paths may be changed in various ways.

Figure 4:
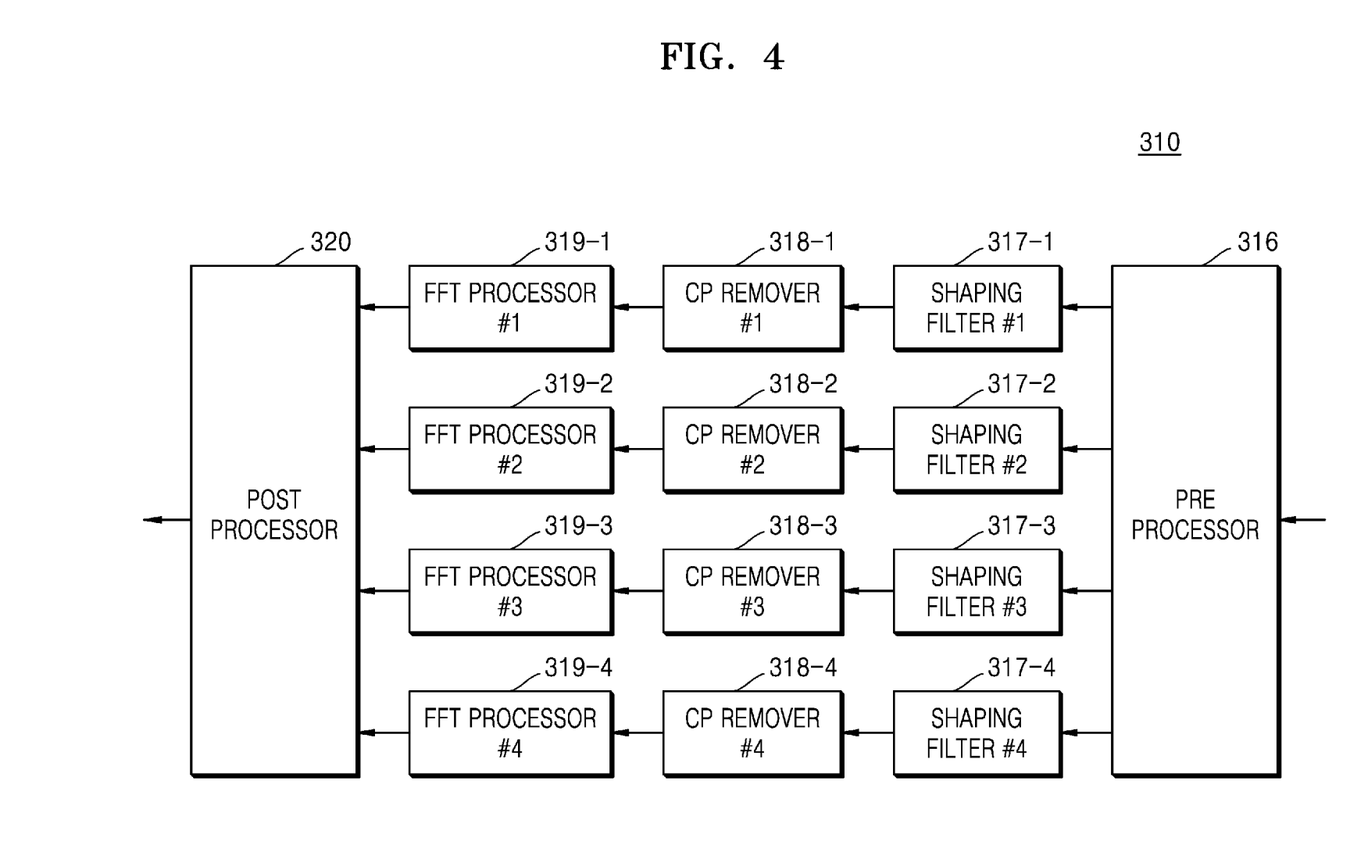
FIG. 4 is a block diagram of some components according to an embodiment of the headend device shown in FIG. 1.

FIG. 4 is a block diagram of some components according to an embodiment of the headend device shown in FIG. 1.

Referring to FIGS. 1 to 4, the headend device 310 may include a pre-processor 316, a plurality of shaping filters 317-1 to 317-4, a plurality of CP removers 318-1 to 318-4, the plurality of FFT processors 319-1 to 319-4, and a post-processor 320.

In FIG. 4, only signal processing paths of a communication signal in uplink communication are shown for convenience, but the headend device 310 may include the components 311, 312-1 to 312-4, 313-1 to 313-4, 314-1 to 314-4, and 315 on signal processing paths of a communication signal in downlink communication of FIG. 3 and the components 316, 317-1 to 317-4, 318-1 to 318-4, 319-1 to 319-4, 320 on signal processing paths of a communication signal in uplink communication of FIG. 4.

According to an embodiment, the headend device 310 may be implemented including a memory (not shown) and a processor, and each of the components 316, 317-1 to 317-4, 318-1 to 318-4, 319-1 to 319-4, and 320 within the headend device 310 may be composed of some functions or modules of at least one processor.

FIG. 4 only illustrates functions that can be supported and processed by the lower physical layer Low-PHY as an example, and some of the functions that can be processed may be excluded, changed, or added.

The pre-processor 316 may receive a communication signal with a variable number of component carriers and perform a pre-processing operation on the received communication signal.

The pre-processor 316 may divide the communication signal into a plurality of divided signals based on the number of component carriers included in the communication signal and the number of signal processing paths provided in a communication node (e.g., the headend device 310) including the pre-processor 316.

Each of the plurality of shaping filters 317-1 to 317-4 may perform filtering to shape communication signals transmitted through each signal processing path.

The headend device 310 may include the CP removers 318-1 to 318-4 for performing CP removal processing of an uplink communication signal, corresponding to CP addition processing in a signal processing path of a downlink communication signal.

The headend device 310 may include the FFT processors 319-1 to 319-4 to perform FFT processing of an uplink communication signal, corresponding to IFFT processing in a signal processing path of a downlink communication signal.

The post-processor 320 may combine divided signals that have been FFT-processed by the plurality of FFT processors 319-1 to 319-4, respectively, and perform post-processing on the combined signals into a form that can be processed by upper nodes (e.g., 200).

A signal processing path of an uplink communication signal in the headend device 310 may include a first signal processing path passing through the first shaping filter 317-1, the first CP remover 318-1, and the first FFT processor 319-1, a second signal processing path passing through the second shaping filter 317-2, the second CP remover 318-2, and the second FFT processor 319-2, a third signal processing path passing through the third shaping filter 317-3, the third CP remover 318-3, and the third FFT processor 319-3, a fourth signal processing path passing through the fourth shaping filter 317-4, the fourth CP remover 318-4, and the fourth FFT processor 319-4.

According to an embodiment, the computational complexity that can be processed in each of signal processing paths may include the computational complexity of each of the plurality of shaping filters 317-1 to 317-4. For example, the computational complexity of each of the plurality of shaping filters 317-1 to 317-4 may include a filter coefficient constituting each of the plurality of shaping filters 317-1 to 317-4.

According to an embodiment, the computational complexity that can be processed in each of signal processing paths may include an FFT size of the FFT processors 319-1 to 319-4 included in each of the signal processing paths.

In FIG. 4, for convenience of explanation, a case in which processing of the lower physical layer Low-PHY is performed in the headend device 310 is illustrated. However, according to an embodiment, the extension device 330 or the remote devices 340 may have the same configuration as the headend device 310 of FIG. 4 and perform the same signal processing as in the headend device 310 of FIG. 4.

FIG. 4 illustrates a case where the number of signal processing paths is four, but the present invention is not limited thereto and the number of signal processing paths may be changed in various ways.

Figure 5:
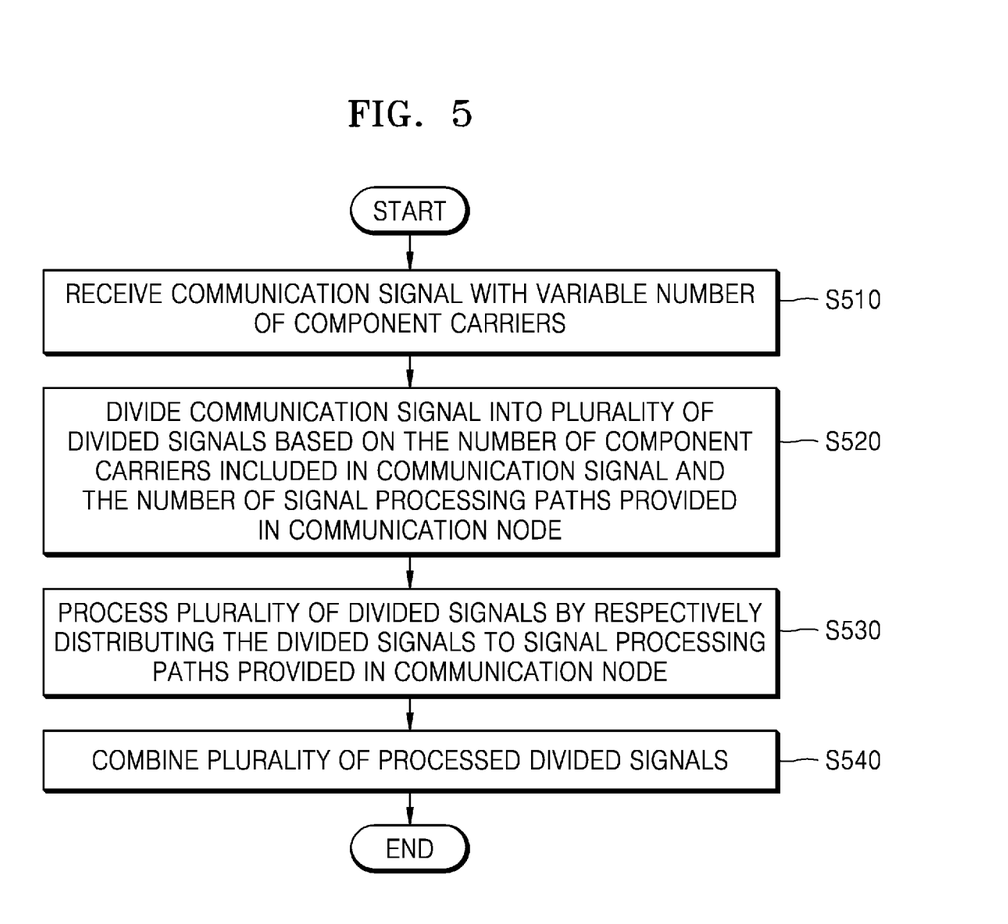
FIG. 5 is a flowchart of a method of operating a communication node according to an embodiment of the present invention.

FIG. 5 is a flowchart of a method of operating a communication node according to an embodiment of the present invention.

Referring to FIGS. 1 to 5, in operation S510, a communication node (e.g., 310, 330, or 340) or the communication system 10 according to an embodiment of the present invention may receive a communication signal with a variable number of component carriers.

According to an embodiment, the number of component carriers included in the communication signal and a channel bandwidth may be varied together.

In operation S520, the communication node (e.g., 310, 330, or 340) or the communication system 10 according to an embodiment of the present invention may divide the communication signal into a plurality of divided signals based on the number of component carriers included in the communication signal and the number of signal processing paths provided in the communication node.

According to an embodiment, the communication node (e.g., 310, 330, or 340) or the communication system 10, when the number of signal processing paths provided in the communication node is greater than the number of component carriers, may divide at least one component carrier into a plurality of subcarriers to form a plurality of divided signals on a component carrier basis or a subcarrier basis.

According to another embodiment, the communication node (e.g., 310, 330, or 340) or the communication system 10, when the number of signal processing paths provided in the communication node is equal to the number of component carriers, may divide a communication signal for each component carrier to form a plurality of divided signals on a component carrier basis.

In operation S530, the communication node (e.g., 310, 330, or 340) or the communication system 10 according to an embodiment of the present invention may process the plurality of divided signals generated by dividing them in operation S520 by respectively distributing them to the signal processing paths provided in the communication node.

According to an embodiment, a signal processing path may include at least one of a pre-processor, an IFFT processor for IFFT processing (or an FFT processor for FFT processing), a CP adder (or a CP remover), a shaping filter, and a post-processor.

In operation S540, the communication node (e.g., 310, 330, or 340) or the communication system 10 according to an embodiment of the present invention may combine the divided signals processed through the respective signal processing paths.

According to an embodiment, the communication node (e.g., 310, 330, or 340) or the communication system 10 may post-process the combined divided signals and transmit them to lower nodes.

Hereinabove, the present invention has been described with reference to the preferred embodiments. However, it will be appreciated by one of ordinary skill in the art that various modifications and changes of the present invention can be made without departing from the spirit and the scope of the present invention which are defined in the appended claims and their equivalents.

The invention claimed is:

1. A method of operating a communication node that includes a memory and a processor and receives and processes a communication signal with a variable number of component carriers, the method comprising:
dividing the communication signal into a plurality of divided signals based on the number of component carriers included in the received communication signal and the number of signal processing paths provided in the communication node; and
distributing the plurality of divided signals to the signal processing paths provided in the communication node, respectively, and processing the divided signals.

2. The method of claim 1, wherein the dividing of the communication signal into a plurality of divided signals comprises:
when the number of signal processing paths provided in the communication node is greater than the number of component carriers, dividing at least one component carrier into a plurality of subcarriers to form the plurality of divided signals.

3. The method of claim 1, wherein the dividing of the communication signal into a plurality of divided signals comprises:
when the number of signal processing paths provided in the communication node is greater than the number of component carriers, dividing one component carrier into a plurality of subcarriers for only some component carriers to form the plurality of divided signals.

4. The method of claim 1, wherein the dividing of the communication signal into a plurality of divided signals comprises:
when the number of signal processing paths provided in the communication node is equal to the number of component carriers, dividing the communication signal for each component carrier to form the plurality of divided signals.

5. The method of claim 1, wherein the number of signal processing paths provided in the communication node is equal to the maximum number of variable component carriers.

6. The method of claim 1, wherein, in the communication signal, the number of component carriers and a channel bandwidth are varied together.

7. The method of claim 6, wherein computational complexity that can be processed in each of the signal processing paths is determined based on the maximum number of variable component carriers and the maximum value of the channel bandwidth.

8. The method of claim 7, wherein the computational complexity that can be processed in each of the signal processing paths comprises an FFT size of an inverse fast fourier transform (IFFT) processor or a fast fourier transform (FFT) processor included in each of the signal processing paths.

9. The method of claim 8, wherein the FFT size corresponds to a value obtained by dividing an FFT size for processing the maximum value of the channel bandwidth in a single FFT processor or IFFT processor by the maximum number of the variable component carriers.

10. The method of claim 7, wherein the computational complexity that can be processed in each of the signal processing paths comprises computational complexity of a shaping filter included in each of the signal processing path.

11. The method of claim 1, further comprising:
receiving the communication signal through Common Public Radio Interface (CPRI), Open Radio Interface (ORI), Open Base Station Architecture Initiative (OB-SAI), or e-CPRI standards.

12. The method of claim 1, wherein the communication node is a headend device, extension device, or remote device.

13. The method of claim 1, further comprising:
combining the plurality of processed divided signals.

14. A communication node that includes a memory and a processor and receives and processes a communication signal with a variable number of component carriers, the communication node configured to:
divide the communication signal into a plurality of divided signals based on the number of component carriers included in the received communication signal and the number of signal processing paths provided in the communication node; and
distribute the plurality of divided signals to the signal processing paths provided in the communication node, respectively, and process the divided signals.

15. A communication system that includes a plurality of communication nodes and receives and processes a communication signal with a variable number of component carriers, the communication system configured to:
divide the communication signal into a plurality of divided signals based on the number of component carriers included in the received communication signal and the number of signal processing paths provided in the communication system; and
distribute the plurality of divided signals to the signal processing paths provided in the communication system, respectively, and process the divided signals.

\* \* \* \* \*